United States Patent [19]
Yui

[11] Patent Number: 6,079,232
[45] Date of Patent: Jun. 27, 2000

[54] WIDENING METHOD

[75] Inventor: Manabu Yui, Wakayama, Japan

[73] Assignee: Shima Seiki Manufacturing, Ltd., Wakayama, Japan

[21] Appl. No.: 09/260,806

[22] Filed: Mar. 2, 1999

[30] Foreign Application Priority Data

Mar. 6, 1998 [JP] Japan .................................. 10-54793

[51] Int. Cl.[7] ........................................................ D04B 7/10
[52] U.S. Cl. ................................................... 66/70; 66/76
[58] Field of Search ............................... 66/60 R, 69, 70, 66/73, 175, 176

[56] References Cited

U.S. PATENT DOCUMENTS

| | | | |
|---|---|---|---|
| 3,474,643 | 10/1969 | Robinson et al. | 66/70 |
| 5,701,766 | 12/1997 | Takahashi | 66/70 |
| 5,826,445 | 10/1998 | Okamoto | 66/70 |

*Primary Examiner*—Danny Worrell
*Attorney, Agent, or Firm*—Nikaido, Marmelstein, Murray & Oram LLP

[57] ABSTRACT

A widened loop is formed by using a flat knitting machine which has at least a pair of needle beds and one of the needle beds can be moved sideways. A widening needle is made to be empty, and yarn is fed from one end of the knitting range to a needle short of the widening needle. Next, yarn is not fed to the widening needle but to a needle next to the widening needle. The yarn feeder is reversed and yarn is fed to the widening needle. Then the yarn feeder is reversed again and yarn is fed to a needle next to the needle to which yarn has been fed. According to the method loops 21, 23 on both sides of the widened loop 11 are connected together by a cross-over yarn 25, and the widened loop 11 is held by a loop 13 of the previous course. Therefore it will not be pulled up. Because of these arrangements, an open gap will be hardly generated around the widened loop 11.

2 Claims, 4 Drawing Sheets

FIG. 1-A
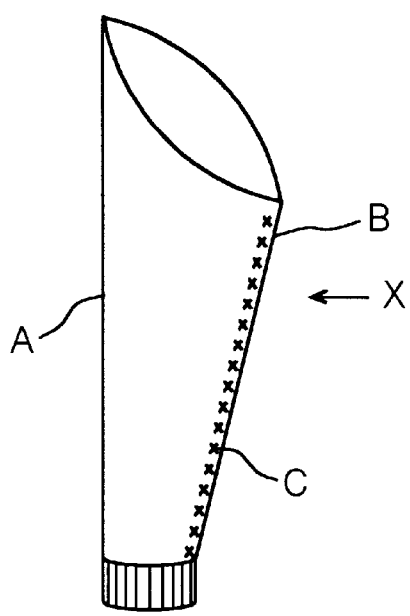
FIG. 1-B
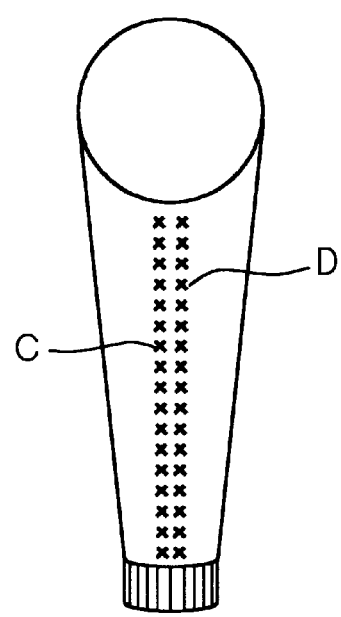

FIG. 3

Prior Art

WIDENING METHOD

FIELD OF THE INVENTION

The present invention relates to a widening method to form a new loop on a needle held no loop when a fabric is knitted on a flat knitting machine.

PRIOR ART

In a process of knitting a fabric on a flat knitting machine, shaped knitting has been carried out for knitting a fabric into a desired shape. The shaped knitting is done by widening and narrowing knitting width, and therefore, wale numbers are increased and decreased. In contrast to a conventional method where the parts of desired shapes are cut out of a fixed width fabric and then put together by sewing, the shaped knitting can knit a fabric into an almost complete shape on a knitting machine. Thus, the steps of the production can be reduced. Furthermore, as shaped knitting generates no cutting losses, it saves on yarn by that amount. Accordingly, a variety of shaped knitting methods have been attempted for curtailing production costs.

One of the techniques for the shaped knitting is widening, where knitting width of a fabric is increased by forming a new loop on an empty needle holding no loop. In widening, a new loop (after this called a widened loop) is formed on a needle holding no loop. According to a conventional widening method, a widened loop is formed by feeding yarn to an empty needle. As a result, at the widening point, as shown in FIG. 5, a newly formed loop 101 is pulled up by a loop 103 of the next course to generate a large open gap 105. This accompanies inferior appearance. The generation of this open gap 105 is due to the lack of a loop of the previous course which holds the newly formed loop 101. As a result, an open gap is generated between two loops 107, 109 adjacent to the newly formed widened loop.

For making the open gap at a widening point less conspicuous, the present applicant has disclosed a widening method in Japanese Patent Sho 62-52063. According to the widening method disclosed in that patent, a first needle and a second needle are arranged to oppose each other on different needle beds which are a front bed and a rear bed. A loop held on the first needle is transferred onto the second needle, and then yarn is fed to the first needle. A loop to be newly formed on the first needle is formed as follows: This loop is passed through the loop transferred from the above first needle onto the second needle, and then the loop transferred onto the second needle is shifted in the transverse direction of the needle bed (after this, the shifting is called racking). Next the loop is transferred onto an empty needle of the original needle bed to form a widened loop. According to this widening method, a widened loop is formed by using transfers between needles arranged on different beds being a front bed and a rear bed.

SUMMARY OF THE INVENTION

One object of the present invention is to provide a new widening method for malting less conspicuous the open gap at a widening point and for forming the widened loop with usage of needles of only one needle bed.

The widening method of the present invention comprises:

a: a step of travelling a yarn feeder in one direction beyond a widening needle (H), and during this travelling, feeding yarn to at least one needle (K~I) being short of said widening needle along said one direction and holding a loop to form at least one new loop, feeding no yarn to said widening needle, and feeding yarn to another needle (G) locating next to the widening needle along said one direction and holding a loop to form a new loop;

b: a step of reversing and travelling the yarn feeder and feeding yarn to only said widening needle (H) to form a new loop; and c: a step of reversing the yarn feeder again, travelling the yarn feeder in said one direction, and during this travelling, feeding yarn to none of said widening needle (H) and said another needle (G), and feeding yarn to needles holding loops for forming new loops, said needles holding loops consisting of a further needle (F) locating next to said another needle (G) along said one direction and holding one of said loops and further needles beyond said further needle.

A widening needle may be prepared by, as is the case in the embodiment, shifting an existing loop sidewise. An existing empty needle may be assigned as a widening needle without making such shift.

The present invention is applied to, for example, the widening of a tubular sleeve comprising a front fabric and a rear fabric, and each of the front fabric and the rear fabric has an inside end and an outside end, and the inside end of the front fabric and the inside end of the rear fabric are joined together and the outside end of the front fabric and the outside end of the rear fabric are joined together.

Here, preferably, the widening method is done by providing a first widening needle near the inside end of the first fabric and providing a second widening needle near the inside end of the second fabric, performing said steps a, b, and c to the first fabric in this turn under the following conditions:

in said step a, travelling the yarn feeder from a point near the inside end of the first fabric toward the outside end of the first fabric beyond said first widening needle, and said at least one needle including a needle at the inside end of the first fabric; and in said step c, travelling the yarn feeder to a point near the outside end of the first fabric, and feeding yarn up to a needle at the outside end of the first fabric, and performing said steps a, b, and c to the second fabric in this turn under the following conditions:

in said step a, travelling the yarn feeder from a point near the outside end of the second fabric toward the inside end of the second fabric beyond said second widening needle, and said at least one needle including a needle at the outside end of the second fabric; and in said step c, travelling the yarn feeder to a point near the inside end of the second fabric, and feeding yarn up to a needle at the inside end of the second fabric.

In this way, fashion lines can be formed on the inner side of the tubular sleeve to make widening. Of course, there are needles holding loops at the inside ends and at the outside ends.

In the invention, since a newly formed widened loop is held on a loop of the previous course just like other loops, it will not be pulled up by a loop of the next course. Moreover, since the adjacent loops that are next to the newly formed loop on both sides thereof are formed continuously, the adjacent loops on both sides are directly connected to each other and the widening point will not expand. The both cross-over yarns of the newly formed loop are pulled to the same point at the widening point, and one of the cross-over yarns passes near the center of the widening point. This cross-over yarn hides the open gap at the widening point. Because of these arrangements, the open hole that is generated at the widening point becomes less conspicuous.

As described above, according to the invention, as a widened loop can be formed with usage of only one of the needle beds, troubles such as drop stitch will not occur even if easily breaking yarn is used or even if a fine widened loop is formed. As a result, a neat widened loop can be formed. Moreover, a widened loop can be formed easily and efficiently.

BRIEF DESCRIPTION OF THE DRAWINGS

FIGS. 1A and B is a diagram showing a sleeve part 1 that is knitted by using the widening method of the invention. FIG. 1-A is a front view of the sleeve part, and FIG. 1-B is a side view of the sleeve part seen in the direction X.

FIG. 3 is a knitting course diagram showing the widening method of the embodiment.

THE BEST EMBODIMENT

The widening method of the embodiment of the invention will be described in detail with reference to the drawings. To facilitate comprehension of the description, a very limited number of needles in comparison with the actual number of needles used in practical knitting are indicated in the description. The widening method is carried out on a two needle bed flat knitting machine having at least a pair of a front needle bed and a rear needle bed, and one or both of these needle beds can be moved sidewise. In the following embodiment, as an example, a two needle bed flat knitting machine of which rear bed can be moved sidewise is used. The widening method of the invention is applicable to widening, where, while the knitting width is kept constant, a widened loop is formed on an empty needle within the knitting width, as well as well as to widening, where the knitting width is increased. In the following embodiment, internal widening will be described as an example.

FIG. 1-A shows a sleeve part 1 in which widened loops are formed by the widening method of the embodiment. FIG. 1-B shows the sleeve part 1 seen in the direction of the arrow X of FIG. 1-A. This sleeve part 1 has an outside end A on the shoulder side when the sleeve part 1 is joined with a separately knitted body not illustrated, and an inside end B toward the un-illustrated body. A front fabric knitted on the front needle bed and a rear fabric knitted on the rear needle bed are joined together. Their outside ends A, A are joined together and their inside ends B, B are joined together into a tubular sleeve. In this sleeve part 1, widening is made at wales three wales away toward the outside ends from the inside ends B of the front fabric and the rear fabric, respectively. Widened loops which are formed in specified courses appear as fashion lines C, D. In the present embodiment, a case of widening for internal widening in a course of knitting the tubular sleeve will be described. The widening method of the invention, however, is not limited to knitting of tubular fabrics.

Figure 2:
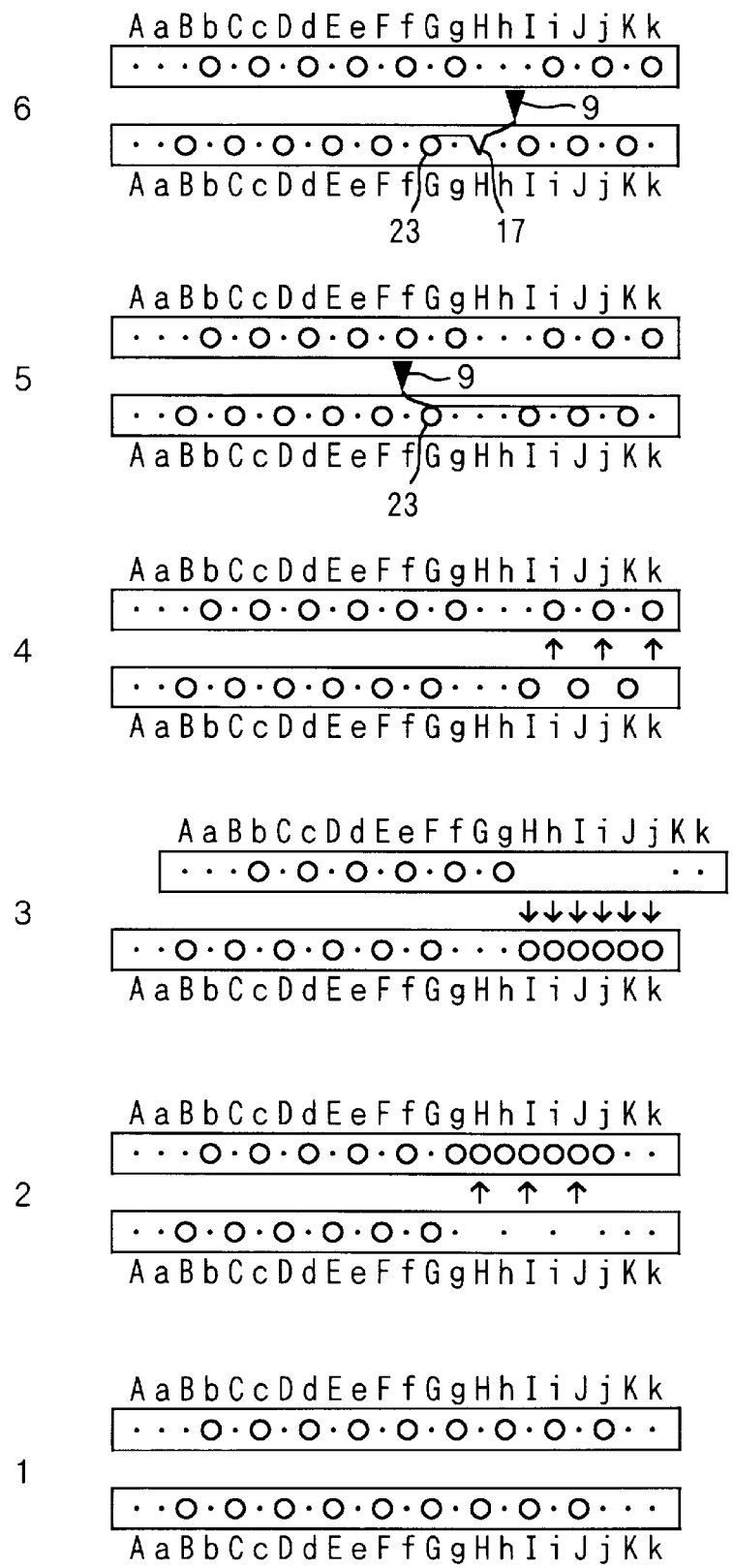
FIG. 2 is a knitting course diagram showing the widening method of an embodiment of the invention.

Course 1 of FIG. 2 shows the sleeve part 1 of which knitting is completed up to a course immediately before a course in which widened loops are to be made. In the embodiment, needles of odd numbers are assigned as needles for knitting the front fabric (indicated by capital letters of alphabet) and needles of even numbers are assigned as needles for knitting the rear fabric (indicated by small letters of alphabet) so that knitting and transferring of the knitted structure which is knitted by using both the front and rear needle beds can be made in the course of knitting the tubular sleeve. As a result, knitting is made with each side of the sleeve having empty needles for transfer on the opposing needle bed. In course 1 of FIG. 2, loops of the front fabric are held on needles B, C, D, . . . ,H, I, J of the front bed, and loops of the rear fabric are held on needles b, c, d, . . . , h, i, j of the rear bed. The moving direction of a yarn feeder is reversed at both ends of the front fabric and the rear fabric, and yarn is fed circularly to both the front fabric and the rear fabric so that the front fabric and the rear fabric are knitted in the form of a tubular sleeve. The front fabric and the rear fabric are continuous to each other at both ends.

In the embodiment, in the front fabric, a widened loop is formed between a loop held on a needle G of the front bed and a loop held on a needle H thereof, and in the rear fabric, a widened loop is formed between a loop held on a needle g of the rear bed and a loop held on a needle h thereof. In course 2, the loop held on the needle H of the front bed which is a needle of the front bed for making a widened loop (hereinafter referred to as a widening needle). The loop on the needle H and loops held on needles I, J of the front bed located outside the needle H are transferred onto needles H, I, J of the opposing rear bed. In course 3, the rear bed is racked to the right by two needles, and the needles for forming the front fabric and the needles for forming the rear fabric oppose each other. After that, the loops of the front fabric transferred onto the rear bed, the loop held on the needle h of the rear bed which is a widening needle of the rear bed, and loops held on needles i, j located outside the needle h are transferred onto the opposing needles of the front bed. In course 4, the rear bed is racked to the left by two needles to bring it back to the same position in course 1. Then loops of the rear fabric held on needles i, j, k of the front bed are transferred onto needles i, j, k of the rear bed. With these steps, the needle H of the front bed and the needle h of the rear bed, both being widening needles, have been made empty or free of any loops.

Next, in course 5, the yarn feeder standing, for example, at the right end of the diagram (a position near the inside end of FIG. 1), upon the completion of the previous course, is made to travel leftward in the diagram to feed yarn to needles K, J, I of the front bed. Next, the yarn feeder is made to pass by the needle H of the front bed, on which a widened loop is to be made, without feeding yarn to it, and the yarn feeder is made to feed yarn to the needle G which is located ahead in the travelling direction of the yarn feeder 9 and is a needle for knitting the front fabric.

In course 6, the yarn feeder is made to reverse and feed yarn to the needle H of the front bed which has been made empty and is a widening needle. At this time, since there is no loop of the previous course on the needle H of the front bed, the yarn which is fed to the needle H will not form any loop in the narrower sense and will be held in the hook of the needle H. In the embodiment, this knitting by feeding yarn to an empty needle is called empty needle knitting, and the yarn which is held in the hook of the needle by empty needle knitting is called a loop 11 of empty needle knitting for simplicity. Knitting operation of empty needle knitting may be knitting, tucking and so on. In course 7, the yarn feeder 9 is reversed again. The yarn feeder 9 is made to pass by the needle G of the front bed on which a loop was formed in course 6 and feed yarn to the needles, F, E, D, C, B which hold loops and are ahead of the needle G in the travelling direction of the yarn feeder 9 up to the outside end.

In course 8, to form a widened loop in the rear fabric, yarn is fed to needles b, c, d, e, f, g of the rear bed. Next, the yarn feeder is made to pass by the widening needle h without feeding yarn, then the yarn feeder is made to feed yarn to the needle i of the rear bed which is located ahead in the travelling direction of the yarn feeder 9. In course 9, the yarn feeder 9 is reversed, and the yarn feeder 9 is made to feed yarn to the needle h of the rear bed which is a widening needle to form a loop of empty needle knitting. In course 10, the yarn feeder 9 is reversed again and is made to pass by the needle i of the rear bed holding a loop formed in course 9 and feed yarn to the needle j and the needle k. The needles j and k are ahead of the needle i in the travelling direction of the yarn feeder 9 and are holding loops. In course 11, yarn is fed to needles K, J, I, . . . , D, C, B of the front bed for knitting the front fabric and in course 12 yarn is fed to needles b, c, d, . . . , i, j, k of the rear bed for knitting the rear fabric to form loops of the next course on both the front fabric and the rear fabric. With these steps, formation of one widened loop on the front fabric and one widened loop on the rear fabric is completed. When the above steps of widening are repeated for an appropriate number of times to form widened loops in appropriate courses while the widening point is always set at the fourth wale from the inside ends B of the front fabric and the rear fabric, the sleeve part 1 shown in FIG. 1 will be knitted.

Courses 2 through 4 of the embodiment are for preparing empty needles H, h for forming widened loops, and these courses 2 through 4 may be omitted. In this case, an empty needle g of the front bed and an empty needle H of the rear bed, which are present under the condition of course 1, are designated as widening needles, and in succession to course 1, knitting corresponding to courses 5 through 12 is made to form a pair of widened loops. In this modification, after the formation of widened loops, there is no empty needle on both sides of each widening needle, thus the conditions of these widening points differ from other points. When knitting corresponding to course 12 is completed, stitches are present up to the needle J on the front bed and stitches are present up to the needle j on the rear bed. Then, for example, after completion of knitting corresponding to course 12, knitting corresponding to courses 2 through 4 is made to shift the needle H of the front bed and the needle h of the rear bed which are at widening points and stitches on their right sides to the right by two needles. Next, in a similar way, the stitch on the needle g of the front bed and the stitch on the needle H of the rear bed are shifted to the right by one needle, respectively. As a result, the conditions of the needle beds will be identical to the conditions of course 12 of FIG. 3 of the embodiment.

Figure 3:
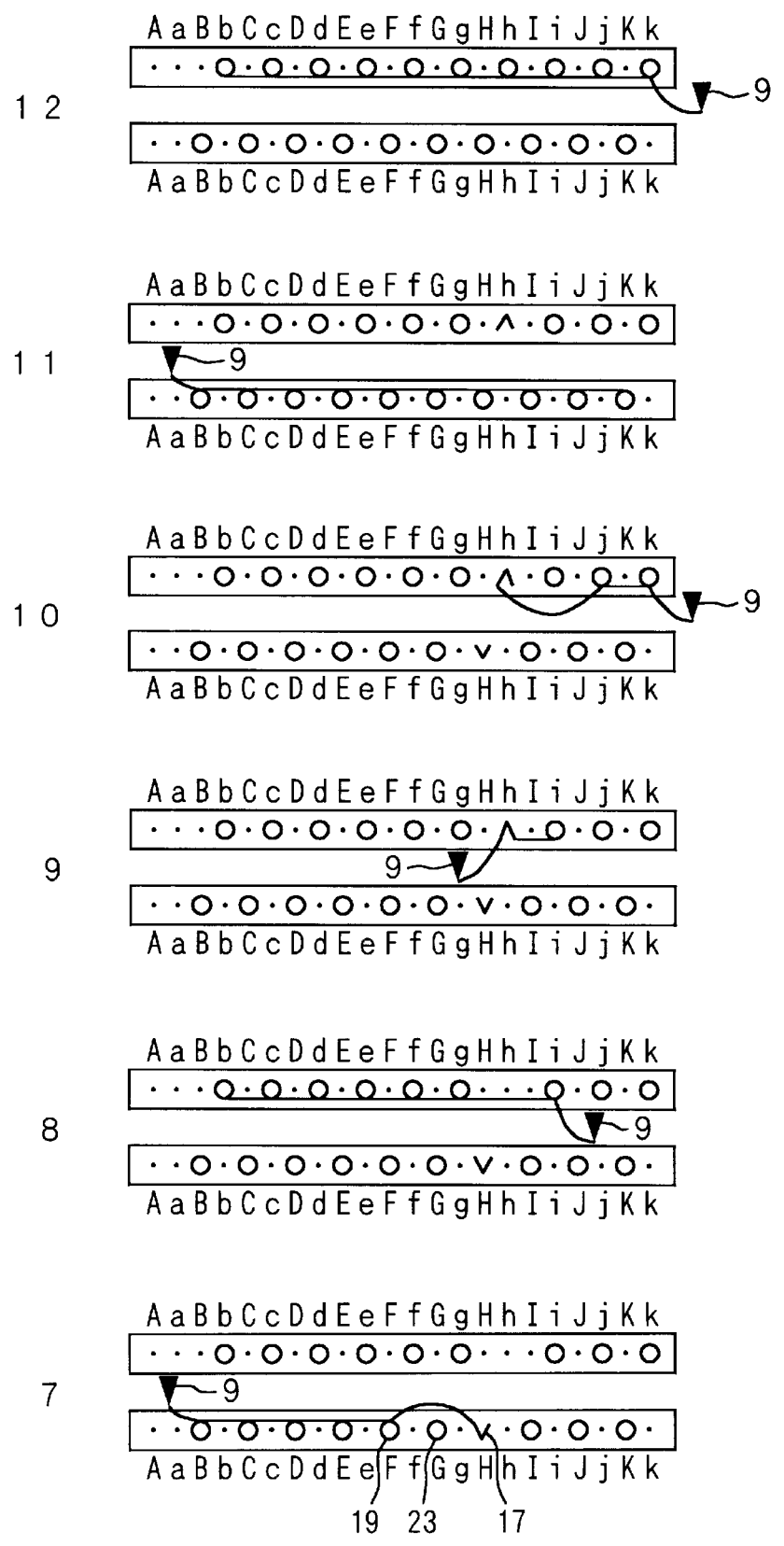
Figure 4:
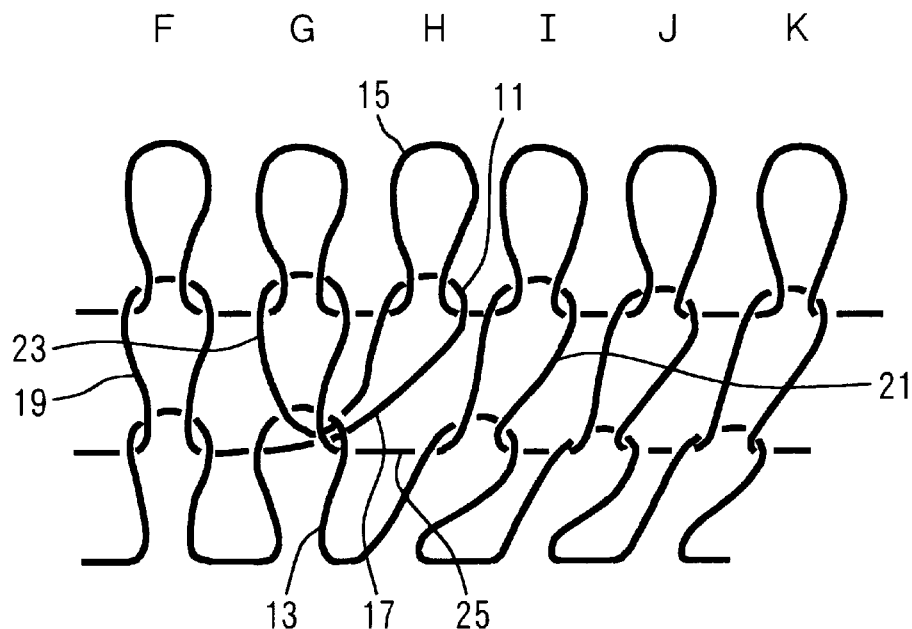
FIG. 4 is a loop diagram showing a widening point of a fabric in which a widened loop is formed by the widening method of the invention.
Figure 5:
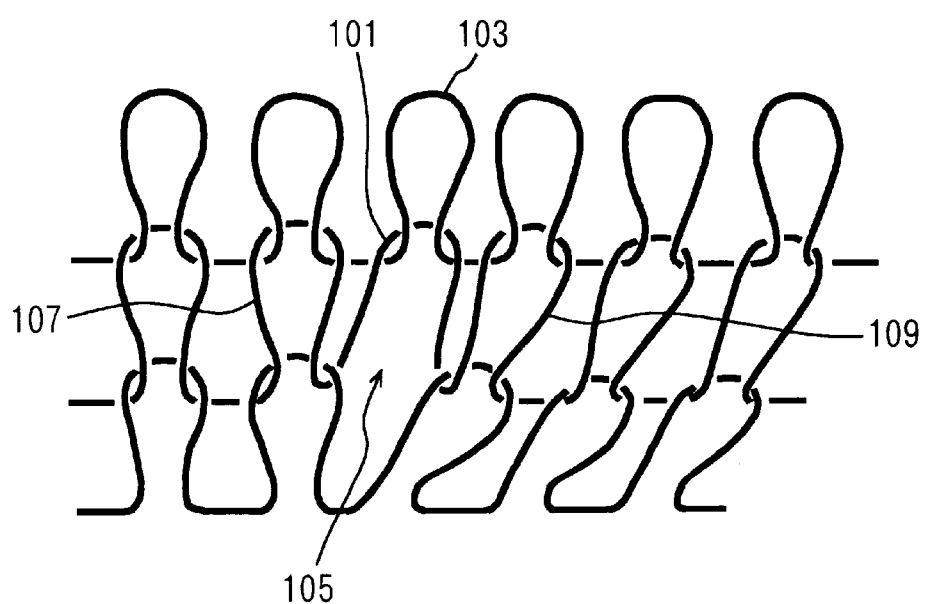
FIG. 5 is a loop diagram showing a widening point of a fabric in which a widened loop is formed by the conventional widening method.

The loop structure at the widening point of the front fabric in which the widened loop is formed is shown in FIG. 4. Alphabetical letters F through J in FIG. 4 indicate needles on which the respective loops are held upon the completion of the knitting of the course 12 of FIG. 3. As shown in FIG. 4, the loop 11 which was newly formed on the needle H is held by the loop 13 of the previous course which was formed on the needle G. As the newly formed loop 11 is held by the loop 13 of the previous course, the newly formed loop 11 will not be pulled up by the loop 15 of the next course. This makes the open gap generated at the widening point less conspicuous. Moreover, one cross-over yarn 17 from the widened loop 11 of the needle H goes beyond the loop 13 of the adjacent needle G and connects to the loop 19 of the needle F. So the newly formed loop 11 is pulled close to the loop 19 of the needle F. As the cross-over yarn 17 covers the widening point, the open gap at the widening point becomes less conspicuous. Furthermore, a cross-over yarn 25 linearly connects the loop 21 of the needle I and the loop 23 of the needle G, and the distance between the loop 21 of the needle I and the loop 23 of the needle G is shortened in comparison with that of the loop structure shown in FIG. 5. Thus, the open gap generated in the widening point becomes less conspicuous.

In the embodiment, needles for knitting the front fabric and needles for knitting the rear fabric are arranged alternately, thus the fabric is knitted by using every other needles in two layers or front fabric and rear fabric. In the embodiment, as the front fabric and the rear fabric are knitted by using every other needles, the needle holding a loop and being located ahead of the needle H in the travelling direction of the yarn feeder is not the needle g of the front bed being a needle for knitting the rear fabric but the needle G being a needle for knitting the same front fabric.

In the above embodiment, widening of the tubular sleeve part 1 is described. The widening method of the embodiment, however, can widen a tubular body part. When the widening of the embodiment is seen in terms of movements of the yarn feeder, it comprises three stages; travel of a yarn feeder beyond a widening needle, reversal of the yarn feeder and feeding yarn to the widening needle, and reversal of the yarn feeder again. In the case of a tubular body part, just like the embodiment, widening is made, for example, near one side end of a front body by making courses similar to courses 5 through 7 of FIG. 2 and FIG. 3 to form a widened loop near one side of the front body. Then, knitting of the course 7 of FIG. 3 is made up to, for example, the center of the front body, and in succession to the course 7, knitting of the course 8 of FIG. 3 is made up to a point near the other side end of the front body, and in succession, knitting of the courses 9 and 10 is made. In this way, a widened loop is formed near the other side of the front body as well. Next, widening is made on the rear body near both sides thereof.

In the above embodiment, the widening method of the invention is described by taking an example of knitting on the two needle bed flat knitting machine provided with a pair of a front needle bed and a rear needle bed. The widening method of the invention, however, is not limited to use of a two needle bed flat knitting machine. For example, the widening method of the invention can be carried out on a three needle bed flat knitting machine or a four needle bed flat knitting machine. In these knitting machines, an upper bed having transfer members such as needles or transfer jacks is provided at least above one of lower needle beds, one in the front and one in the rear. The above embodiment is described by taking an example of increasing the knitting width. However, the widening method of the invention is also applicable to moving stitch pattern knitting. There, the knitting width is kept constant, and in the course of knitting the fabric, a loop of the fabric is made to overlap with an adjacent loop of the same fabric by transfer to make an needle empty and a widened loop is newly formed on this empty needle. Moreover, these knitting can be used in combination. In such a case, an empty needle or empty needles can be prepared by transferring sideways a loop or loops held on the widening needle and so on.

What is claimed is:

1. A widening method using a flat knitting machine having at least a pair of parallel needle beds, each pair of parallel needle beds including a front needle bed and a rear needle bed facing said front needle bed, each of the front and rear needle beds has a first end and a second end and includes a plurality of needles thereon, at least one of said front and rear needle beds is shiftable laterally relative to the pair of needle beds, wherein a new loop of yarn is formed on a widening needle, said widening needle being at least one empty needle of the plurality of needles of the front and rear needle beds within a knitting range of a knitted fabric, said widening method comprising the following steps:

a: moving a yarn feeder beyond the widening needle in a first direction from the first ends of the front and rear needle beds toward the second ends of the front and rear needle beds, and during the moving of the yarn feeder, feeding yarn to at least one needle of the plurality of needles before said widening needle along said first direction and holding a first loop to form at least one first new loop, and feeding yarn to another needle of the plurality of needles, said another needle being positioned proximate to and after the widening needle along said first direction and holding a second loop to form a second new loop;

b: reversing and moving the yarn feeder in a second direction from the second ends of the front and rear needle beds toward the first ends and feeding yarn to said widening needle to form a third new loop; and c: reversing the yarn feeder again to move alone said first direction, and during the moving of the yarn feeder feeding yarn to remaining needles of said plurality of needles holding fourth loops for forming fourth new loops, said remaining needles holding fourth loops having a further needle located as following said another needle along said first direction and holding one of said fourth loops.

2. The widening method of claim 1 further comprising:

providing a tubular sleeve comprising a first fabric and a second fabric, each of the first and second fabrics having an inside end and an outside end, wherein the inside end of the first fabric and the inside end of the second fabric are joined together, and the outside end of the first fabric and the outside end of the second fabric are joined together, providing a first widening needle near the inside end of the first fabric and providing a second widening needle near the inside end of the second fabric, performing steps a, b, and c to the first fabric in the recited order under the following conditions:

in said step a, moving the yarn feeder from a point near the inside end of the first fabric toward the outside end of the first fabric beyond said first widening needle, and said at least one needle of the plurality of needles before said first widening needle including an inside end needle at the inside end of the first fabric, and in said step c, moving the yarn feeder to a point near the outside end of the first fabric, and feeding yarn to an outside end needle at the outside end of the first fabric, and performing said steps a, b, and c to the second fabric in the recited order under the following conditions:

in said step a, moving the yarn feeder from a point near the outside end of the second fabric toward the inside end of the second fabric beyond said second widening needle, and said at least one needle of the plurality of needles before said second widening needle including an outside end needle at the outside end of the second fabric, and in said step c, moving the yarn feeder to a point near the inside end of the second fabric, and feeding yarn to an inside end needle at the inside end of the second fabric.

* * * * *